Nov. 27, 1934.　　　　C. F. GILLETTE　　　　1,982,210

PHOTOGRAPHIC PROCESS

Filed Sept. 2, 1931

INVENTOR
Clyde F. Gillette

BY　Harris D. Hindlin
ATTORNEY

UNITED STATES PATENT OFFICE 1,982,210

PHOTOGRAPHIC PROCESS

Clyde F. Gillette, New York, N. Y., assignor to United Research Corporation, Long Island City, N. Y., a corporation of Delaware Application September 2, 1931, Serial No. 560,745

8 Claims. (Cl. 88—16)

This invention relates to composite photography, and particularly to means for combining a foreground subject with a previously photographed background in a single photographic print.

In the making of photographs, and particularly in making motion pictures it is freqently found desirable to show a foreground such as action occurring at a place, or with a background, to which it is not convenient to send the foreground subject or actors.

An object of this invention is to produce a picture of foreground subjects, against a previously photographed background by ordinary illumination of the foreground subjects.

Another object of this invention is to combine a foreground subject and a previously photographed background in a camera by means of ordinary white light.

Still another object of this invention is to combine a foreground subject with a previously photographed background, by means of ordinary studio illumination.

Still another object of this invention is to photograph simultaneously a foreground subject, and print an appropriate background.

A still further object of this invention is to simultaneously photograph a foreground action, and print a background having an opening therein equivalent to the foreground subject, and thereafter print the foreground subject into the opening in the background print.

Still another object of this invention is to produce a plurality of prints simultaneously in a single camera, having complementary outlines.

Still another object of this invention is to produce a composite positive print directly in the camera.

In the prior art of composite photography, it has been found possible to combine a previously photographed background with a foreground subject by a process in which the background is produced in the form of a dye-image positive print, placed in front of the sensitive material, and the action photographed by light of the same color as the dye print, against a background illuminated with a contrasting color. This process is, however, complicated, because of the requirement of a plurality of carefully balanced colored lights, and the dye print, which is both expensive and somewhat difficult to make.

This invention illuminates the foreground subject or action in the usual way, provides a back screen of high luminosity, collects light from both in the usual camera lens, and projects it upon a triple set of films, the front film being sensitive and receiving the foreground picture normally and becoming developable to opacity where the high luminosity back screen affects it. Simultaneously the rear film, also sensitive, has printed upon it by the unobscured portion of the luminous screen a positive image from an interposed background negative. The foreground film is then developed and finished, and printed in register upon the rear film, to produce a positive print of the foreground subject, thus producing on a single film both foreground and background, in the form of a positive print, from which a suitable negative, and other positives may be produced.

The process of this invention thus utilizes only ordinary lights, and only ordinary film, which need not be specially sensitive, to produce the desired composite photograph.

Other objects and details of this invention will be apparent from the following description when read in connection with the accompanying drawing, wherein.

Figure 1:
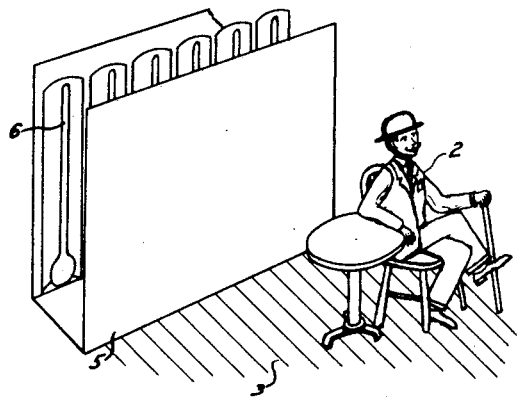
Fig. 1 is a view of the essential elements of the invention.

In the operation of the process of this invention, a finished negative of the desired background is loaded into a camera between two sensitive films, the front film, toward the lens, being preferably a normally sensitive negative emulsion of appropriate contrast, and the back film, away from the lens, being a slower emulsion, preferably a positive stock. The camera 1, so loaded, is then set up before the action or foreground 2 on a stage 3, which is illuminated with the usual studio lights 4 which may be high power incandescent lamps, mercury arc lamps, or carbon arc lamps. The back screen 5 is then provided behind the foreground or action, to provide a strongly luminous member sufficiently large to fill the field of view of the camera. This back screen may conveniently consist of a bank of mercury arc lamps 6 and a diffusing screen 5, such as tracing cloth or other appropriate material. Alternatively the back screen may consist of a reflecting member strongly illuminated by appropriate light sources. It is necessary that the luminosity of the back screen be sufficiently high to penetrate the front film in the camera, and print the interposed negative onto the back film.

The photographing of the action may then take place to yield a foreground or action negative upon the front film 7 which has the foreground subjects normally exposed, with the remainder of the film strongly exposed. At the same time the background negative 8 is printed onto the back film 9 at all parts except where the light from the back screen is obscured by the foreground subject.

The films are then removed from the camera, and the foreground negative 7 developed and finished. It is then combined with the previously exposed background film 9, and printed thereon. The rear film 9 is then developed to yield the desired composite print. It may be noted that the difference in speed of the two sensitive films in the camera is easily made such that the light from the foreground action which is transmitted by the front film 7 is insufficient to produce any exposure upon the rear film 9, whereas the high luminosity back screen not only exposes the film surrounding the foreground image upon the film 7 to such a degree as to render it completely opaque after development, but also passes sufficient light through the front film 7 to print the background negative 8 upon the rear film 9. Thus the back film 9 after the first step in the process has a latent image impressed upon it of that portion of the background print 8 which is desired around the foreground subject, but the portion of the picture to be devoted to the foreground subject matter is substantially entirely unexposed. The second step then prints the details of the foreground into this unexposed portion to complete the composite photograph.

It is desirable that the printing of the developed foreground negative 7 upon the second film 9, in the second step of the process, be done by a device utilizing substantially parallel light, and equipped with accurate register pins for maintaining registry of each successive frame, when motion pictures are made. The usual printers will serve for this purpose, but superior results are obtainable by utilizing a camera for this printing process, with the original high luminosity back screen as the printing-light source. The original camera with which the photographing of the foreground subject was done may be utilized, or alternatively, if sound was synchronized with the action, a non-synchronous camera may be utilized for the printing process.

Referring to the drawing, the camera 1 may be loaded with the films as previously described. The foreground subject, which may be an actor 2, is then arranged upon a stage 3, with the camera 1 in front of the stage, and illuminated in the usual way by one or more light sources 4. A high luminosity back screen 5 is provided as described, conveniently consisting of a bank of mercury arc tubes 6 as shown, with a front diffusing screen.

Figure 2:
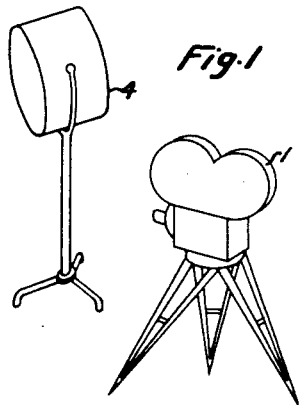
Fig. 2 is a diagrammatic representation of optical principles involved in the step of photographing the foreground.
Figure 2:
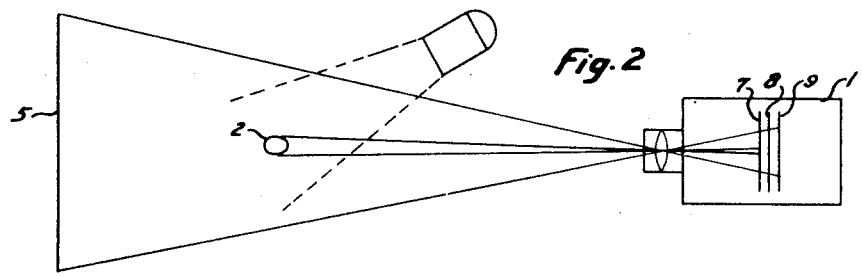
Figure 3:
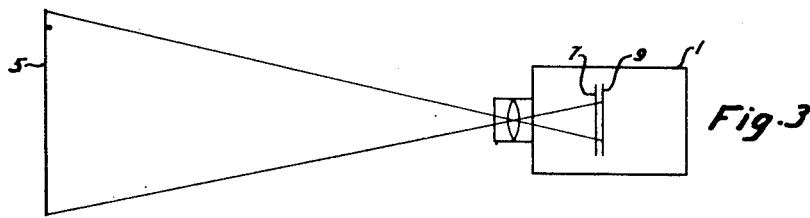
Fig. 3 is a diagrammatic representation of the optical principles involved in combining the foreground and background exposures.
Figure 4:
Fig. 4 is a representation of the foreground film after development.
Figure 5:
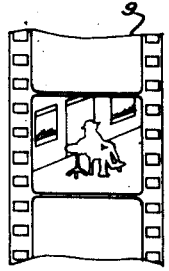
Fig. 5 is a representation of the second or background film after the first photographing.
Figure 6:
Fig. 6 is a representation of the second film after the second printing and developing.

As shown in Fig. 2, light from the ordinary stage lights 4, is reflected from the actor 2, collected by the camera lens, and focussed upon the front film 7, to make a normal exposure of the foreground subject. Simultaneously light from the back screen 5, is collected by the camera lens and thrown upon the front film 7. The light from the foreground subject 2 is of moderate intensity, and is largely absorbed by the front film 7, and the remainder is of too low intensity to affect the rear film 9. The light from the back screen 5, however, is of much higher intensity. It strikes the front film 7, wherever it is not obstructed by the foreground subject, and renders developable substantially all of the emulsion it falls upon. A portion of this light is absorbed, and a portion is also transmitted, and this transmitted portion is of sufficient intensity to print the background negative film 8 upon the sensitive film 9.

After this exposure the three films 7, 8 and 9 may be separated, and the background negative 8 removed and laid aside, as for future use. The foreground film 7 is then developed and finished to produce a normal dry negative having the foreground subject in normal density on an opaque field. The two films 7 and 9 may then be put in register into a convenient printing machine, which as previously mentioned may advantageously be the same camera set up before the same luminous screen but without any intervening foreground subject. The light from the luminous back screen then prints the foreground subject into the unprinted portion of the film previously exposed behind the background negative. This procedure thus results in a composite positive print, in which the action is photographed and the background printed, in one operation, whereafter the action is printed on the same film with the background to produce the desired print.

This process avoids the previous necessity for complementary colored lights upon background and foreground, and in addition it avoids the necessity for a dye transparency, which is tedious and difficult to make. It further shortens the time of operations, since it is difficult to produce a satisfactory dye positive in less than 24 hours, whereas this process requires no preliminary work beyond the provision of the background negative, and the step of developing and printing the foreground negative requires only an hour or two, thus producing a worth while saving in time. Furthermore, stock and standard film only is required, and no special panchromatic film is needed. Likewise, the expense of the making of a dye positive is avoided, which is a substantial item.

It is, of course, obvious that some care is required to balance the lights appropriately, and an appropriate difference in sensitivity of the two films is essential. This, however, is found to be conveniently obtainable with commercial negative stock, and commercial printing stock. It is of course obvious that the foreground illumination must be sufficient to normally expose the front negative film, and that the back film must be of sufficiently low sensitivity as not to be exposed by the foreground light transmitted through the front film and background negative. Simultaneously the luminosity of the back screen must be high enough to send sufficient light through the front film to print the back ground negative upon the back film. It is found, however, that these requirements are met with a substantial margin for unusual situations, by the use of normal negative and ordinary duplicating film stock in the camera, normal illumination upon the foreground, and a back screen illuminated by the usual studio bank of mercury arcs.

It is further obvious that the second or printing step must be conducted with strict register between the two films, by which is required not only exact register frame by frame with the previous position of the films in the first or taking step, but also exact register of each frame. The first is conveniently obtainable by an appropriate mark upon the films, such as punch marks, wax crayon marks, etc. The second register is most conveniently obtainable by the use of a camera for printing which uses dowelling register pins for holding the film during the exposure. Alternatively similar register pins may be incorporated in a step printer, or by appropriate care a continuous printer may be used. It is further desirable that parallax difficulties incident to the use of several films be compensated for, which is most conveniently done by utilizing for the printing, either parallel light, or light from the same lens and back screen as was utilized for the taking step.

The process of this invention thus produces a new, simple, and satisfactory method for making composite photographs.

While the foregoing description discloses but a single embodiment of the process of this invention it is capable of modification therefrom without departure from the inventive concept disclosed and it is therefore desired that only such limitations shall be imposed upon the appended claims as are stated therein, or required by the prior art.

The invention claimed is:

1. The process of photographing comprising the steps of photographing on a film a foreground, producing an opaque surrounding portion for the photograph of said foreground, and simultaneously printing a background upon a second film in register with said first-mentioned film, by the light which produces the opacity surrounding the photograph of the foreground subject.

2. The process of photographing comprising the steps of photographing on a film a foreground, producing an opaque surrounding portion for the photograph of said foreground, and simultaneously printing a background upon a second film in register with said first-mentioned film, by the light which produces the opacity surrounding the photograph of the foreground subject, and thereafter printing the foreground negative upon the previously printed film.

3. The process of photographing which comprises photographing a background, to produce a background negative, combining the background negative with a sensitive film at each side thereof, normally illuminating a foreground subject against a high luminosity back screen, and exposing said films in register with said negative to said screen and to said foreground subject so illuminated.

4. The process of photographing which comprises photographing a background subject, to produce a background negative, combining the background negative with a sensitive film at each side thereof, normally illuminating a foreground subject against a high luminosity back screen, exposing said negative and said films to said screen and to said foreground subject so illuminated, thereafter removing the background negative, developing one of the films, and printing it upon the other of the films.

5. The process of photographing which comprises exposing a light sensitive film to a foreground in front of a luminous back screen, exposing said film to light from said screen to render the portion of the film surrounding the foreground image substantially opaque, and simultaneously utilizing a portion of the back screen light to print an image upon another film in register with said first mentioned film.

6. The process of photographing which consists in the steps of photographing a background scene, producing a negative thereof, assembling the negative between a pair of superimposed sensitive films, simultaneously exposing said films so assembled to a foreground against a luminous screen so as to produce a foreground negative with an opaque field and simultaneously print the in-between background negative upon the other sensitized film over an area corresponding to the opaque field, developing the foreground negative and printing the foreground negative onto said other sensitized film.

7. The process of photographically producing foreground and background components of a composite picture on separate films in mutually exclusive areas comprising, normally exposing one light sensitive film to reproduce a foreground subject with an opaque field, and simultaneously printing on a superimposed light sensitive film a background subject around the silhouette of said foreground subject, while blocking out the light for said printing by said foreground subject.

8. The process of photographically producing a composite picture according to claim 7 which comprises preparing a positive print of the exposed film of said foreground subject and printing said positive print onto said background film within said silhouette.

CLYDE F. GILLETTE.